United States Patent
Yang

(10) Patent No.: US 10,019,104 B2
(45) Date of Patent: Jul. 10, 2018

(54) ARRAY SUBSTRATE, DISPLAY PANNEL, AND DISPLAY DEVICE WITH PRESSURE SENSING ELECTRODE BLOCK EMBEDDED THEREIN

(71) Applicants: XIAMEN TIANMA MICRO-ELECTRONICS CO., LTD., Xiamen (CN); TIANMA MICRO-ELECTRONICS CO., LTD., Shenzhen (CN)

(72) Inventor: Yizhi Yang, Xiamen (CN)

(73) Assignees: XIAMEN TIANMA MICRO-ELECTRONICS CO., LTD., Xiamen (CN); TIANMAN MICRO-ELECTRONICS CO., LTD., Shenzhen (CN)

(*) Notice: Subject to any disclaimer, the term of this patent is extended or adjusted under 35 U.S.C. 154(b) by 0 days.

(21) Appl. No.: 15/211,983

(22) Filed: Jul. 15, 2016

(65) Prior Publication Data

US 2017/0269763 A1   Sep. 21, 2017

(30) Foreign Application Priority Data

Mar. 17, 2016   (CN) .......................... 2016 1 0152431

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 3/0414* (2013.01)

(58) Field of Classification Search
CPC .... G06F 3/0416; G06F 3/0412; G06F 3/0414; G06F 3/041–3/045
See application file for complete search history.

(56) References Cited

U.S. PATENT DOCUMENTS 9,158,407 B2   10/2015   Coulson et al.
2011/0157087 A1   6/2011   Kanehira et al.
(Continued)

FOREIGN PATENT DOCUMENTS

| CN | 105068695 A | 11/2015 |
|---|---|---|
| CN | 204926052 U | 12/2015 |

(Continued)

OTHER PUBLICATIONS

Chinese First OA dated Jan. 4, 2018 in the corresponding Chinese application (application No. 201610152431.9).

*Primary Examiner* — Temesghen Ghebretinsae
*Assistant Examiner* — Ivelisse Martinez Quiles
(74) *Attorney, Agent, or Firm* — Kilpatrick Townsend & Stockton LLP

(57) ABSTRACT

An array substrate array, a display panel and a display device are provided. The array substrate includes multiple touch electrode blocks, multiple pressure sensing electrode blocks, and multiple drive modules. Each of the multiple pressure sensing electrode blocks is embedded within a corresponding one of the multiple touch electrode blocks, and the pressure sensing electrode blocks are not in contact with the touch electrode blocks. The drive module is configured to electrically connect the touch electrode block to the pressure sensing electrode block embedded within the touch electrode block and input a touch sensing signal during a touch sensing period. The drive module is configured to electrically disconnect the touch electrode block from the pressure sensing electrode block embedded within the touch electrode block and input a pressure sensing signal to the pressure sensing electrode block during a pressure sensing period.

15 Claims, 7 Drawing Sheets

(56) References Cited

U.S. PATENT DOCUMENTS

| | | | | |
|---|---|---|---|---|
| 2016/0342256 A1* | 11/2016 | Zhou | ............... | G06F 3/0412 |
| 2017/0068368 A1* | 3/2017 | Hsiao | ............... | G06F 3/0416 |
| 2017/0192565 A1* | 7/2017 | Pan | ............... | G06F 3/0412 |
| 2017/0192582 A1* | 7/2017 | Pan | ............... | G06F 3/0416 |
| 2017/0235414 A1* | 8/2017 | Ding | ............... | G06F 3/0416 |

FOREIGN PATENT DOCUMENTS

| | | |
|---|---|---|
| CN | 204965387 U | 1/2016 |
| CN | 205038622 U | 2/2016 |
| CN | 205038623 U | 2/2016 |

\* cited by examiner

ARRAY SUBSTRATE, DISPLAY PANNEL, AND DISPLAY DEVICE WITH PRESSURE SENSING ELECTRODE BLOCK EMBEDDED THEREIN

CROSS REFERENCE OF RELATED APPLICATION

The present application claims the priority to Chinese Patent Application No. 201610152431.9, titled "ARRAY SUBSTRATE, DISPLAY PANEL, AND DISPLAY DEVICE", filed on Mar. 17, 2016 with the State Intellectual Property Office of the People's Republic of China, the content of which is incorporated herein by reference in its entirety.

FIELD

The disclosure relates to the technical field of display, and in particular to an array substrate, a display panel, and a display device.

BACKGROUND

In recent years, touch display apparatuses as information input tools of electronic products are widely used in various display products such as mobile phones, televisions and computers, which brings great convenience to people's daily work and life. With the continuous development of science and technology, a conventional display device includes not only a capacitive sensing structure but also a pressure sensing structure. That is, a touch sensing function and a pressure sensing function can be achieved for the conventional display device in a time-division driving manner. However, the display device with the touch sensing function and the pressure sensing function has poor touch sensitivity during a touch sensing period.

SUMMARY

In view of this, an array substrate, a display panel and a display device are provided according to the disclosure. During a touch sensing period, a pressure sensing electrode block is electrically connected to a touch electrode block corresponding to the pressure sensing electrode block, and a touch sensing signal is inputted into the pressure sensing electrode block and the touch electrode block simultaneously, in order to compensate an amount of induction of the touch electrode block embedded with the pressure sensing electrode block, thereby increasing sensitivity during the touch sensing period and improving touch effect of the display device.

In order to achieve the above objectives, the following technical solution is provided according to the disclosure.

An array substrate is provided, which includes: multiple touch electrode blocks, multiple pressure sensing electrode blocks, and multiple drive modules. Each of the multiple pressure sensing electrode blocks is embedded within a corresponding one of the multiple touch electrode blocks, and the multiple pressure sensing electrode blocks are not in contact with the multiple touch electrode blocks. The drive module is configured to electrically connect the touch electrode block to the pressure sensing electrode block embedded within the touch electrode block and input a touch sensing signal during a touch sensing period. The drive module is also configured to electrically disconnect the touch electrode block from the pressure sensing electrode block embedded within the touch electrode block and input a pressure sensing signal to the pressure sensing electrode block during a pressure sensing period.

Preferably, each of the multiple drive modules may include: a first controllable switching element, a second controllable switching element, a first signal terminal and a second signal terminal.

The first controllable switching element includes a control terminal, a first terminal and a second terminal. The control terminal of the first controllable switching element is inputted with a first drive signal. The first terminal of the first controllable switching element is connected to the first signal terminal and connected to one of the multiple touch electrode blocks, and the second terminal of the first controllable switching element is connected to one of the multiple pressure sensing electrode blocks.

The second controllable switching element includes a control terminal, a first terminal and a second terminal. The control terminal of the second controllable switching element is inputted with a second drive signal, the first terminal of the second controllable switching element is connected to the second signal terminal, and the second terminal of the second controllable switching element is connected to one of the multiple pressure sensing electrode blocks.

The first controllable switching element is controlled by the first drive signal to be turned on. The second controllable switching element is controlled by the second drive signal to be turned off, and the first signal terminal outputs the touch sensing signal, during the touch sensing period. The first controllable switching element is controlled by the first drive signal to be turned off, the second controllable switching element is controlled by the second drive signal to be turned on, and the second signal terminal outputs the pressure sensing signal, during the pressure sensing period.

Preferably, the first controllable switching element is a first transistor, and the second controllable switching element is a second transistor.

Preferably, the first transistor has a same conductive type as the second transistor.

Preferably, each of the first transistor and the second transistor is an N-type transistor.

Preferably, each of the first transistor and the second transistor is a P-type transistor.

Preferably, the first transistor has a different conductive type from the second transistor.

Preferably, the first drive signal is the same as the second drive signal, and the first drive signal and the second drive signal are outputted from a same drive signal terminal.

Preferably, the first transistor is an N-type transistor, and the second transistor is a P-type transistor.

Preferably, the first transistor is a P-type transistor, and the second transistor is an N-type transistor.

Preferably, each of the first transistor and the second transistor is a thin film transistor or a field effect transistor.

Preferably, each of the touch electrode blocks and the pressure sensing electrode blocks is a transparent electrode block.

Preferably, the array substrate may include a common electrode, where the multiple touch electrode blocks and the multiple pressure sensing electrode blocks are formed by dividing the common electrode.

A display panel is further provided according to the disclosure, which includes the above array substrate.

A display device is further provided according to the disclosure, which includes the above array substrate.

As compared with the conventional technology, the technical solution according to the disclosure has at least the following advantages.

An array substrate, a display panel, and a display device are provided according to the disclosure. The display panel includes: multiple touch electrode blocks, multiple pressure sensing electrode blocks, and multiple drive modules. Each of the multiple pressure sensing electrode blocks is embedded within one of the multiple touch electrode blocks, and the multiple pressure sensing electrode blocks are not in contact with the multiple touch electrode blocks. The drive module is configured to electrically connect the touch electrode block to the pressure sensing electrode block embedded within the touch electrode block and input a touch sensing signal during a touch sensing period, and to electrically disconnect the touch electrode block from the pressure sensing electrode block embedded within the touch electrode block and input a pressure sensing signal to the pressure sensing electrode block during a pressure sensing period.

As can be understood from the above description, during the touch sensing period, the pressure sensing electrode block is electrically connected to the touch electrode block corresponding to the pressure sensing electrode block, and the touch sensing signal is inputted into the pressure sensing electrode block and the touch electrode block simultaneously. This can compensate an amount of induction of the touch electrode block embedded with the pressure sensing electrode block, thereby increasing sensitivity during the touch sensing period and improving the touch effect of the display device.

BRIEF DESCRIPTION OF THE DRAWINGS

The drawings to be used in the description of embodiments or the conventional technology are described briefly as follows, so that the technical solutions according to the embodiments of the present disclosure or according to the conventional technology become clearer. It is apparent that the drawings in the following description only illustrate some embodiments of the present disclosure. For those skilled in the art, other drawings may be obtained according to these drawings without any creative work.

FIG. 3b is a timing diagram corresponding to FIG. 3a;

FIG. 4b is a timing diagram corresponding to FIG. 4a;

DETAILED DESCRIPTION OF THE EMBODIMENTS

The technical solution according to the embodiments of the present disclosure are described clearly and completely in conjunction with the drawings hereinafter. It is apparent that the described embodiments are only a few rather than all of the embodiments of the present disclosure. Any other embodiments obtained by those skilled in the art based on the embodiments in the present disclosure without any creative work fall into the scope of the present disclosure.

As described in the background, the conventional display device with the touch sensing function and the pressure sensing function has poor touch sensitivity during the touch sensing period. Specifically, reference is made to FIG. 1, which is a schematic structural diagram of a conventional display device. In the conventional display device, the array substrate includes multiple touch electrode blocks 10 and multiple pressure sensing electrode blocks 20. As can be seen, each of the multiple pressure sensing electrode blocks 20 is embedded within corresponding one of the multiple touch electrode blocks 10, with a gap existing between each of the multiple pressure sensing electrode blocks 20 and the corresponding one of the multiple touch electrode blocks 10. As also can be seen, each of the multiple touch electrode block 10 is connected to a drive IC via a touch lead, and each of the multiple pressure sensing electrode blocks 20 is connected to the drive IC via an electrode lead.

A display period, a touch sensing period, and a pressure sensing period are achieved for the conventional display device in a time-division driving manner. A reference signal is inputted into both the touch electrode block and the pressure sensing electrode block by the driver IC during the display period. A touch sensing signal is inputted into the touch electrode block while the reference signal or no signal is inputted into the pressure sensing electrode block by the driver IC during the touch sensing period. No signal is inputted into the touch electrode block while a pressure sensing signal is inputted into the pressure sensing electrode block by the driver IC during the pressure sensing period.

Figure 1:
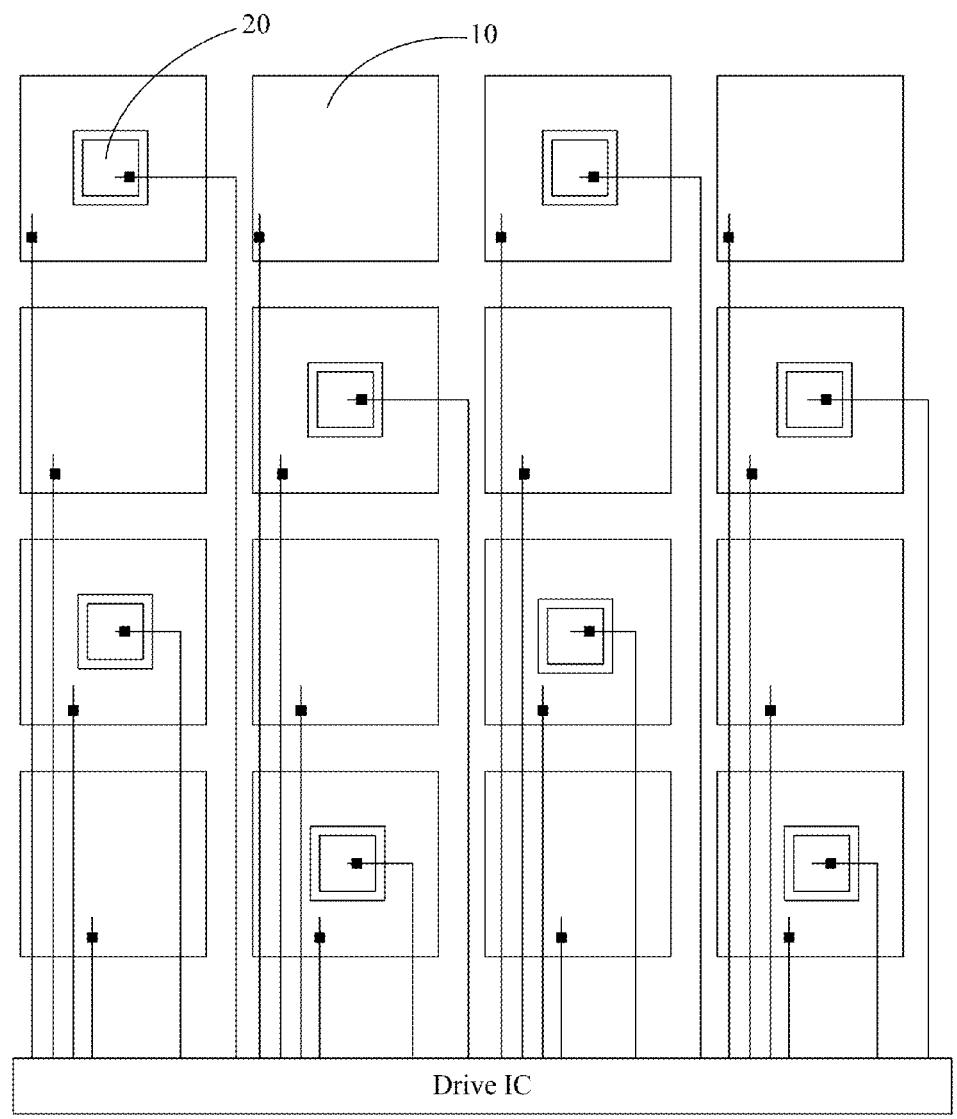
FIG. 1 is a schematic structural diagram of a conventional display device.

As shown in FIG. 1, in the conventional display device, since the touch electrode block embedded with the pressure sensing electrode block has a smaller area than other touch control electrode blocks, the amount of induction is reduced during the touch sensing period, thereby resulting in poor touch sensitivity of the display device during the touch sensing period, and reducing the touch effect of the display device.

On the basis of the above, an array substrate, a display panel and a display device are provided according to the disclosure. During a touch sensing period, a pressure sensing electrode block is electrically connected to a touch electrode block corresponding to the pressure sensing electrode block, and a touch sensing signal is inputted into the pressure sensing electrode block and the touch electrode block simultaneously to compensate an amount of induction of the touch electrode block embedded with the pressure sensing electrode block. This can increase sensitivity during the touch sensing period and improving the touch effect of the display device.

Figure 2:
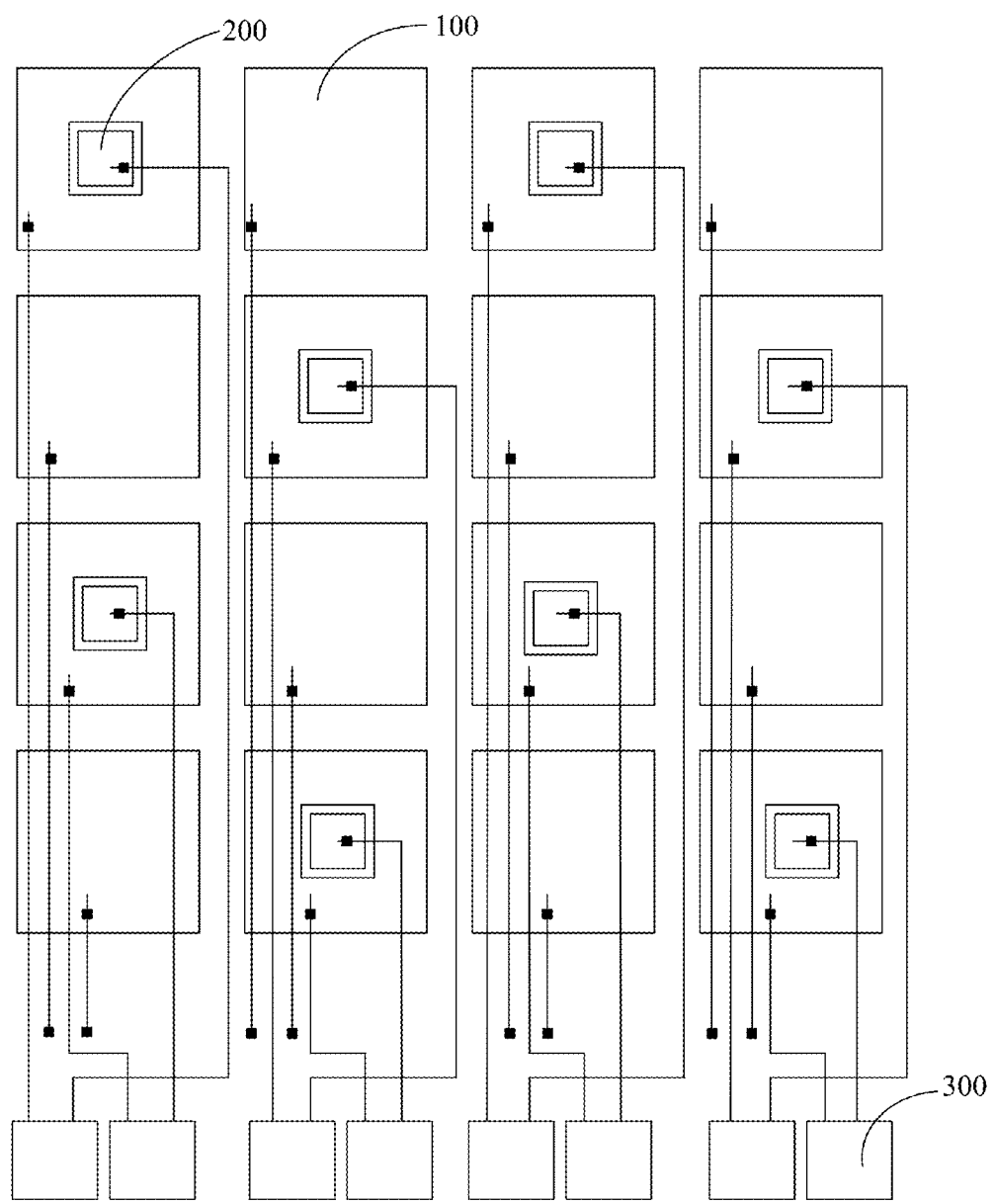
FIG. 2 is a schematic structural diagram of an array substrate according to an embodiment of the disclosure.

Reference is made to FIG. 2, which is a schematic structural diagram of an array substrate according to an embodiment of the disclosure. As shown in FIG. 2, the array substrate includes: multiple touch electrode blocks 100, multiple pressure sensing electrode blocks 200, and multiple drive modules 300.

Each of the multiple pressure sensing electrode blocks 200 is embedded within one of the multiple touch electrode blocks 100, and the multiple pressure sensing electrode blocks 200 are not in contact with the multiple touch electrode blocks 100.

The drive module 300 is configured to electrically connect the touch electrode block 100 to the pressure sensing electrode block 200 embedded within the touch electrode block 100 and input a touch sensing signal during a touch sensing period. The drive module 300 is also configured to electrically disconnect the touch electrode block 100 from the pressure sensing electrode block 200 embedded within the touch electrode block 100 and input a pressure sensing signal to the pressure sensing electrode block 200 during a pressure sensing period.

It should be noted that, in the array substrate according to the disclosure, a touch electrode block that does not have a pressure sensing electrode block embedded therein is connected to the drive IC via a touch lead. In this way, the touch sensing signal can be inputted to the touch electrode block through the drive IC during the touch sensing period, a reference voltage can be inputted to the touch electrode block through the drive IC during the display period, and no signal may be inputted to the touch electrode block during the pressure sensing period.

As can be seen from the above description, during the touch sensing period, the pressure sensing electrode block is electrically connected to the touch electrode block corresponding to the pressure sensing electrode block. The touch sensing signal is inputted into the pressure sensing electrode block and the touch electrode block simultaneously to compensate an amount of induction of the touch electrode block embedded with the pressure sensing electrode block. This can increase sensitivity during the touch sensing period and improving the touch effect of the display device.

Figure 3A:
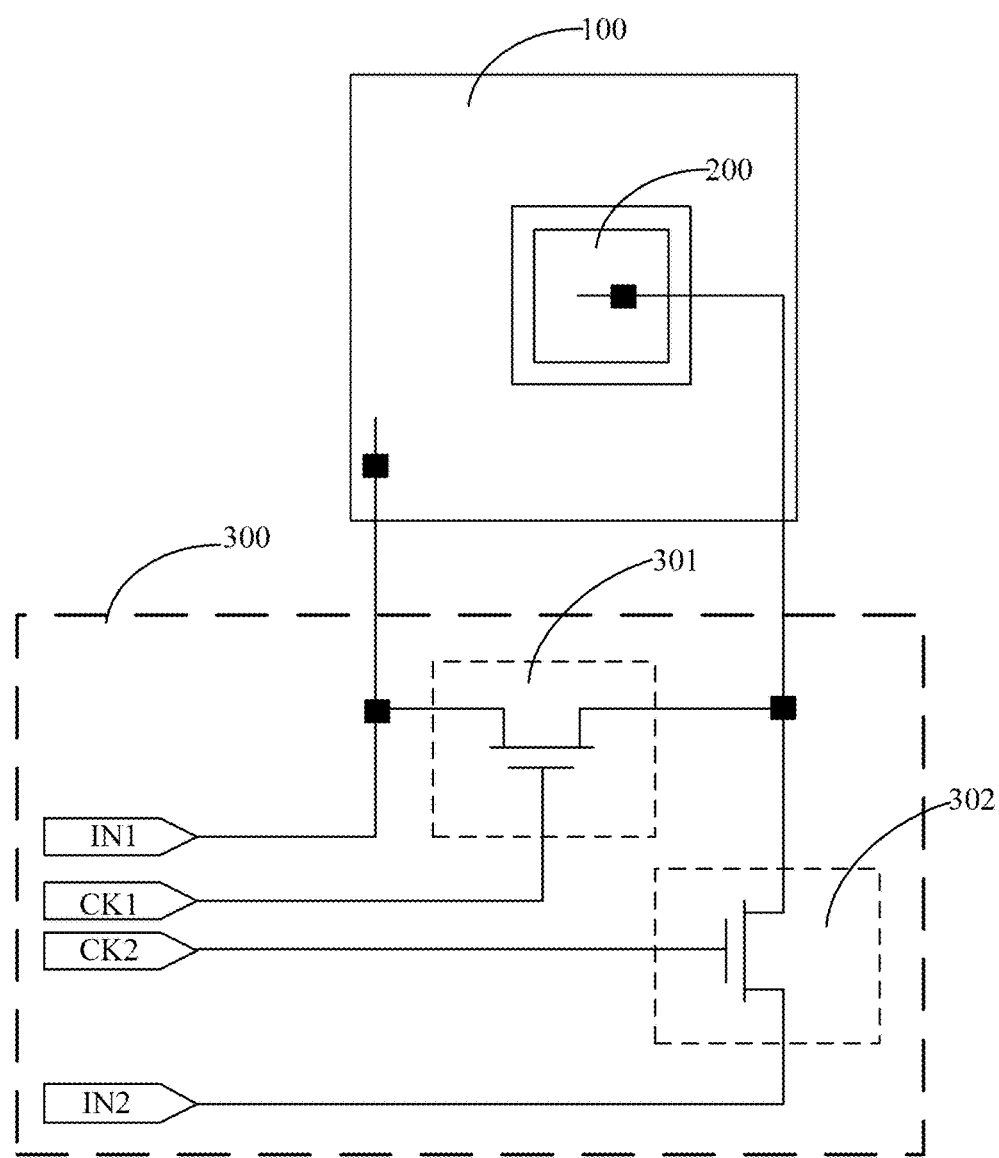
FIG. 3a is a schematic structural diagram of a drive module according to an embodiment of the disclosure.

The driving module according to the disclosure is configured to electrically connect the pressure sensing electrode block to the touch electrode block corresponding to the pressure sensing electrode block and input the touch sensing signal into both the pressure sensing electrode block and the touch electrode block simultaneously during the touch sensing period, thereby compensating an amount of induction of the touch electrode block. The driving module is configured to electrically disconnect the pressure sensing electrode block from the touch electrode block corresponding to the pressure sensing electrode block and input the pressure sensing signal into the pressure sensing electrode block during the pressure sensing period. The driving module is configured to input the reference signal into the touch electrode block and the pressure sensing electrode block during the display period. Reference is made to FIG. 3a, which is a schematic structural diagram of a drive module according to an embodiment of the disclosure. The drive module 300 according to the embodiment of the disclosure includes: a first controllable switching element 301, a second controllable switching element 302, a first signal terminal IN1 and a second signal terminal IN2.

The first controllable switching element 301 includes a control terminal, a first terminal and a second terminal. The control terminal of the first controllable switching element 301 is inputted with a first drive signal CK1. The first terminal of the first controllable switching element 301 is connected to the first signal terminal IN1 and connected to the touch electrode block 100. The second terminal of the first controllable switching element 301 is connected to the pressure sensing electrode block 200.

The second controllable switching element 302 includes a control terminal, a first terminal and a second terminal. The control terminal of the second controllable switching element 302 is inputted with a second drive signal CK2, The first terminal of the second controllable switching element 302 is connected to the second signal terminal IN2, and the second terminal of the second controllable switching element 302 is connected to the pressure sensing electrode block 200.

In this embodiment, the first drive signal CK1 controls the first controllable switching element 301 to be turned on, the second drive signal CK2 controls the second controllable switching element 302 to be turned off, and the first signal terminal IN1 outputs the touch sensing signal, during the touch sensing period. The first drive signal CK1 controls the first controllable switching element 301 to be turned off, the second drive signal CK2 controls the second controllable switching element 302 to be turned on, and the second signal terminal IN2 outputs the pressure sensing signal, during the pressure sensing period.

Specifically, referring to FIG. 3a, the first controllable switching element 301 according to the disclosure may be a first transistor, and the second controllable switching element 302 may be a second transistor.

In addition, the first transistor 301 may have a same conductive type as the second transistor 302 according to the embodiment of the disclosure. That is, each of the first transistor and the second transistor may be an N-type transistor. Alternatively, each of the first transistor and the second transistor may be a P-type transistor.

Figure 3B:
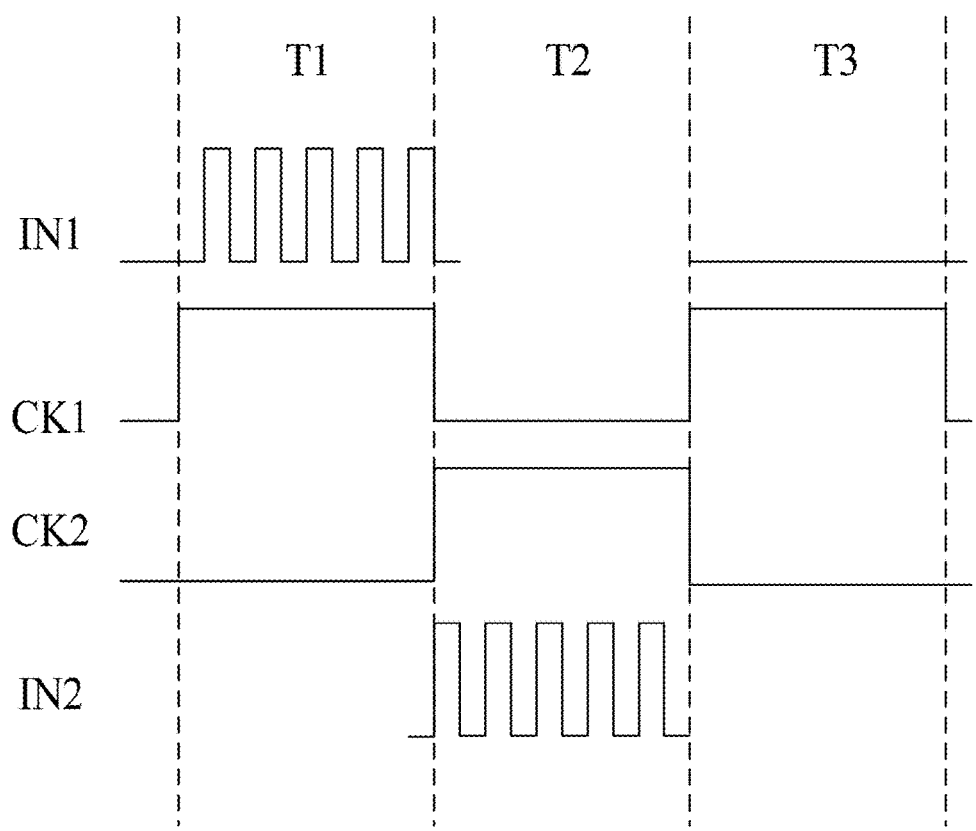

Reference is made to FIG. 3b, which is a timing diagram corresponding to FIG. 3a. The embodiment is described with an example of each of the first transistor and the second transistor being an N-type transistor. During the touch sensing period T1, the first drive signal CK1 is at a high level to control the first transistor 301 to be turned on, and the second drive signal CK2 is at a low level to control the second transistor 302 to be turned off. In this case, the first signal terminal IN1 outputs the touch sensing signal, and no signal may be outputted from the second signal terminal IN2.

During the pressure sensing period T2, the first drive signal CK1 is at a low level to control the first transistor 301 to be turned off, and the second drive signal CK2 is at a high level to control the second transistor 302 to be turned on. In this case, no signal may be outputted from the first signal terminal IN1, and the second signal terminal IN2 outputs the pressure sensing signal.

Further, during the display period T3, the first drive signal CK1 may be at a high level to control the first transistor 301 to be turned on, and the second drive signal CK2 may be at a low level to control the second transistor 302 to be turned off. In this case, the first signal terminal IN1 outputs the reference signal, and no signal may be outputted from the second signal terminal IN2. In some embodiments, both the first drive signal and the second drive signal are at a high level to control both of the first transistor and the second transistor to be turned on. In this case, each of the first signal terminal and the second signal terminal outputs the reference signal. The control manner of the drive module during the display period is not limited in the embodiment of the disclosure.

Figure 4A:
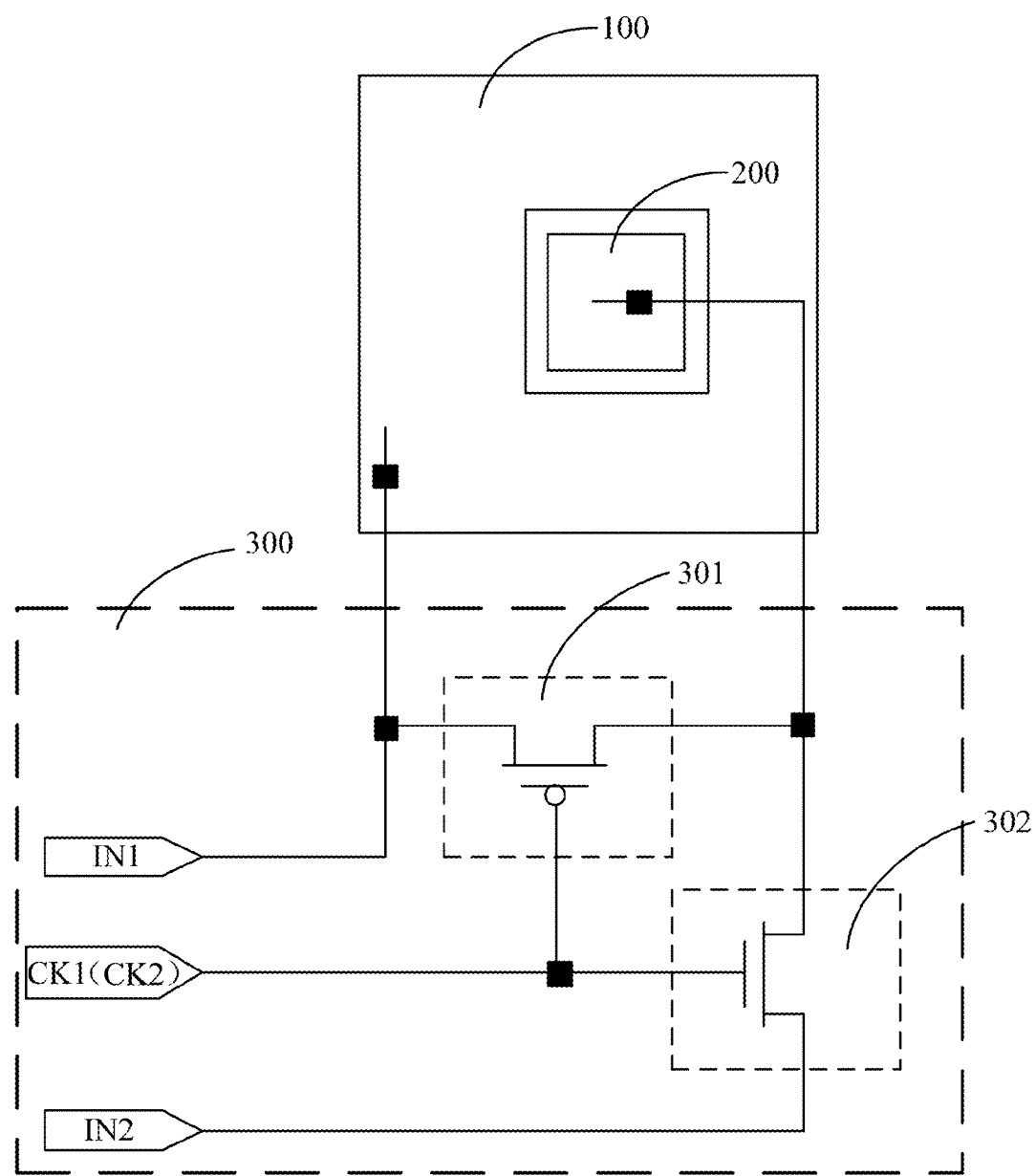
FIG. 4a is a schematic structural diagram of a drive module according to an embodiment of the disclosure.

Further, since the first controllable switch element and the second controllable switch element are not turned on or turned off simultaneously, the first transistor may have a different conductive type from the second transistor in order to reduce the number of wirings. Reference is made to FIG. 4a, which is a schematic structural diagram of a drive module according to an embodiment of the disclosure. The first controllable switch element 301 according to the embodiment of the disclosure may be the first transistor, and the second controllable switching element 302 may be the second transistor. The first transistor may have a different conductive type from the second transistor. That is, the first transistor is an N-type transistor while the second transistor is a P-type transistor, or the first transistor is a P-type transistor while the second transistor is an N-type transistor.

The first drive signal CK1 is the same as the second drive signal CK2, and the first drive signal CK1 the second drive signal CK2 are outputted from a same drive signal terminal.

Figure 4B:
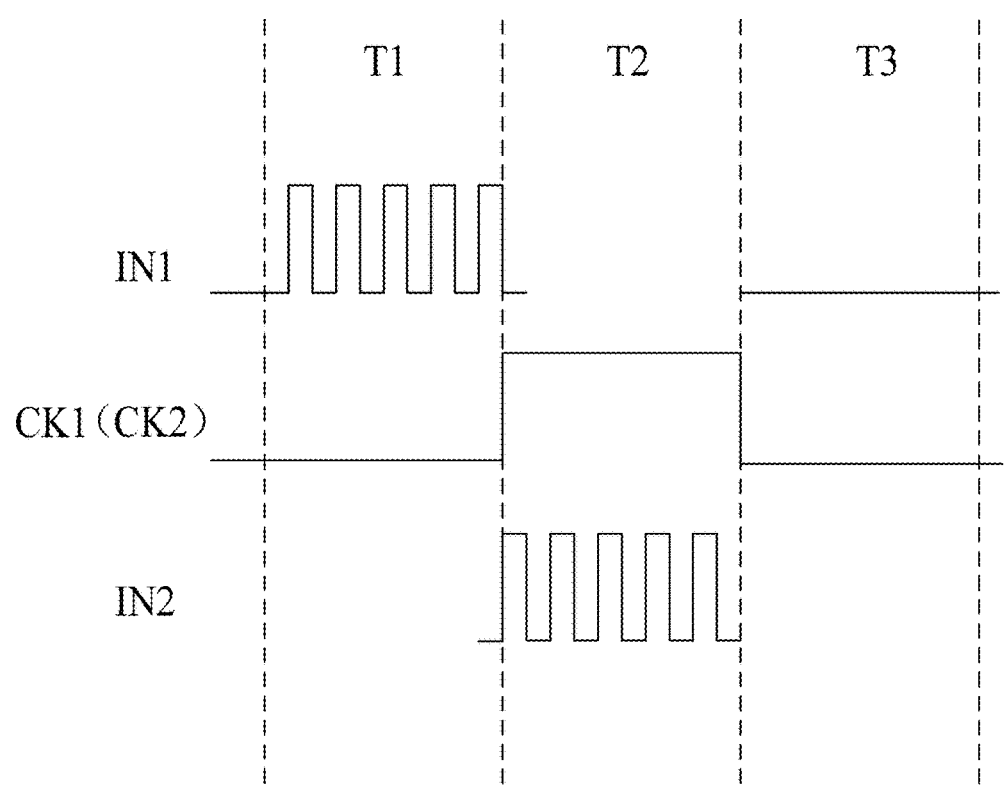

Reference is made to FIG. 4b, which is a timing diagram corresponding to FIG. 4a. The embodiment of the disclosure is described with an example of the first transistor being a P-type transistor and the second transistor being an N-type transistor. During the touch sensing period T1, the first drive signal CK1 (the second drive signal CK2) is at a low level to control the first transistor 301 to be turned on and control the second transistor 302 to be turned off. In this case, the first signal terminal IN1 outputs the touch sensing signal, and no signal may be outputted from the second signal terminal IN2.

During the pressure sensing period T2, the first drive signal CK1 (the second drive signal CK2) is at a high level to control the first transistor 301 to be turned off and control the second transistor 302 to be turned on. In this case, no signal may be outputted from the first signal terminal IN1, and the second signal terminal IN2 outputs the pressure sensing signal.

Further, during the display period T3, the first drive signal CK1 (the second drive signal CK2) is at a low level to control the first transistor 301 to be turned on and control the second transistor to be turned off. In this case, the first signal terminal IN1 outputs the reference signal, and no signal may be outputted by the second signal terminal IN2.

In any one of the above embodiments, each of the first transistor and the second transistor according to the disclosure may be a thin film transistor or a field effect transistor, which is not limited in the embodiments of the disclosure.

In addition, in any one of the above embodiments, each of the touch electrode block and the pressure sensing electrode block according to the disclosure is a transparent electrode block. The array substrate includes a common electrode which is divided to form the multiple touch electrode blocks and the multiple pressure sensing electrode blocks. The reference signal according to the above embodiments is a common voltage signal.

Figure 5:
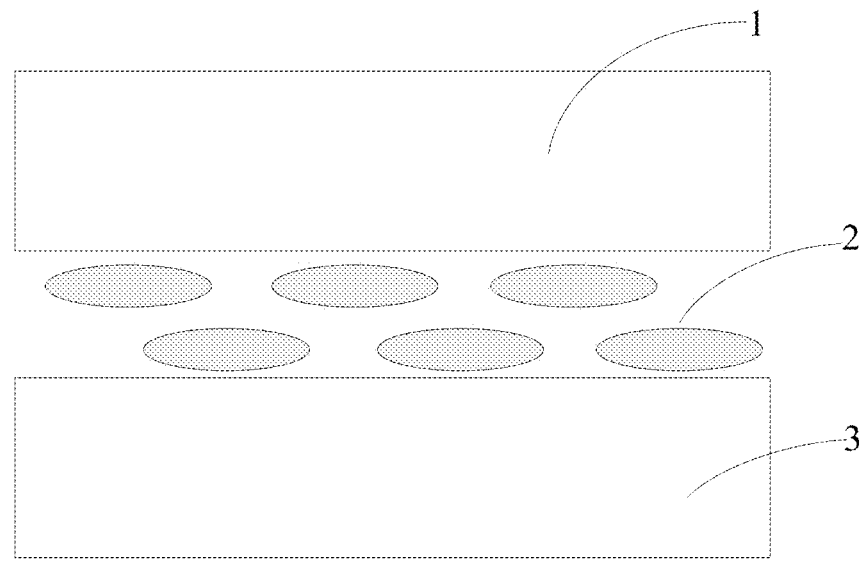
FIG. 5 is a schematic structural diagram of a display panel according to an embodiment of the disclosure.

Accordingly, a display panel is further provided according to an embodiment of the disclosure. The display panel includes the above array substrate. The display panel according to the embodiment of the disclosure may be a liquid crystal display panel. Reference is made to FIG. 5, which is a schematic structural diagram of a display panel according to an embodiment of the disclosure. The display panel includes: the array substrate 1 according to any one of the above embodiments, a liquid crystal layer 2, and a color film substrate 3 arranged at a side of the liquid crystal layer 2 away from the array substrate 1.

It should be noted that, the display panel according to the embodiment of the disclosure may be not only a liquid crystal display panel, but also any other type of display panel, which is not limited in the embodiment of the disclosure.

Figure 6:
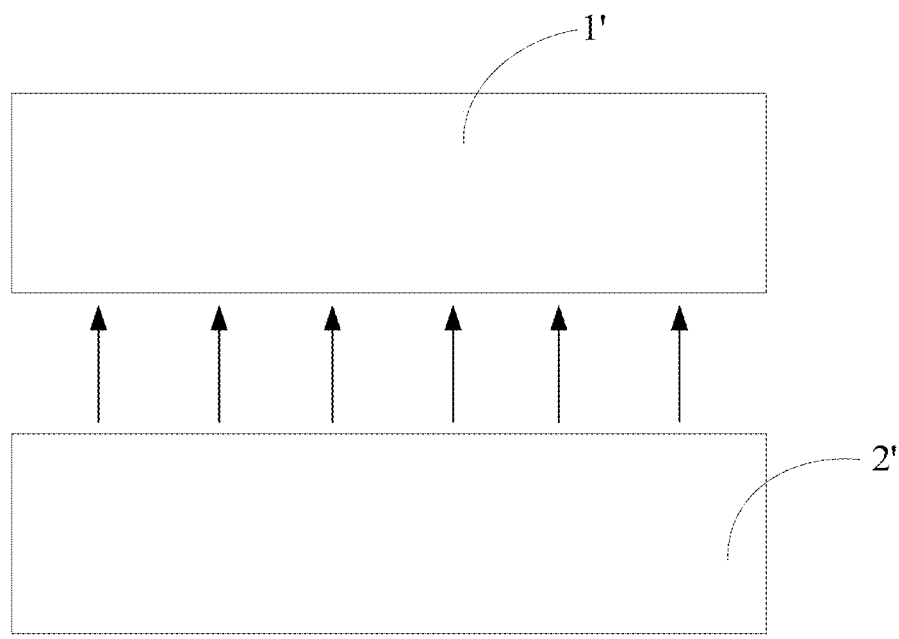
FIG. 6 is a schematic structural diagram of a display device according to an embodiment of the disclosure.

Accordingly, a display device is further provided according to an embodiment of the disclosure. The display device includes the above array substrate. The display device according to the embodiment of the disclosure may be a liquid crystal display device. Reference is made to FIG. 6, which is a schematic structural diagram of a display device according to an embodiment of the disclosure. The display device includes: the display panel 1' according to the above embodiment, and a backlight module 2' which provides backlights (light rays indicated by arrows in FIG. 6) to the display panel 1'.

It should be noted that, the display device according to the disclosure is not limited to a liquid crystal display device, but may also include any other type of display device.

An array substrate array, a display panel and a display device are provided according to the embodiments of the disclosure. The array substrate includes multiple touch electrode blocks, multiple pressure sensing electrode blocks, and multiple drive modules. Each of the multiple pressure sensing electrode blocks is embedded within one of the multiple touch electrode blocks, and the multiple pressure sensing electrode block are not in contact with the multiple touch electrode blocks. The drive module is configured to electrically connect the touch electrode block to the pressure sensing electrode block embedded within the touch electrode block and input a touch sensing signal during a touch sensing period, and to electrically disconnect the touch electrode block from the pressure sensing electrode block embedded within the touch electrode block and input a pressure sensing signal to the pressure sensing electrode block during a pressure sensing period.

As can be understood from the above description, according to the technical solution of the disclosure, during the touch sensing period, the pressure sensing electrode block is electrically connected to the touch electrode block corresponding to the pressure sensing electrode block, and the touch sensing signal is inputted into the pressure sensing electrode block and the touch electrode block simultaneously, in order to compensate an amount of induction of the touch electrode block embedded with the pressure sensing electrode block, thereby increasing sensitivity during the touch sensing period and improving the touch effect of the display device.

According to the above description of the disclosed embodiments, those skilled in the art can implement or practice the present disclosure. Many changes to these embodiments are apparent for those skilled in the art, and general principles defined herein may be implemented in other embodiments without departing from the spirit or scope of the present disclosure. Hence, the present disclosure is not limited to the embodiments disclosed herein, but is to conform to the widest scope in accordance with the principles and novel features disclosed herein.

The invention claimed is:

1. An array substrate, comprising:
    a plurality of touch electrode blocks;
    a plurality of pressure sensing electrode blocks, wherein each pressure sensing electrode block of the plurality of pressure sensing electrode blocks is embedded within a corresponding touch electrode block of the plurality of touch electrode blocks, and the plurality pressure sensing electrode blocks are not in contact with the plurality of touch electrode blocks; and
    a plurality of drive modules, wherein each drive module of the plurality of the drive modules is configured to:
    electrically connect a touch electrode block of the plurality of touch electrode blocks to a corresponding pressure sensing electrode block of the plurality of pressure sensing electrode blocks, the corresponding pressure sensing electrode block being embedded within the touch electrode block,
    input a touch sensing signal during a touch sensing period to the touch electrode block and the corresponding pressure sensing electrode block,
    electrically disconnect the touch electrode block from the corresponding pressure sensing electrode block embedded within the touch electrode block, and input a pressure sensing signal to the corresponding pressure sensing electrode block during a pressure sensing period.

2. The array substrate according to claim 1, wherein each drive module of the plurality of drive modules comprises: a first controllable switching element, a second controllable switching element, a first signal terminal and a second signal terminal, wherein the first controllable switching element comprises a control terminal, a first terminal and a second terminal, wherein the control terminal of the first controllable switching element is inputted with a first drive signal, the first terminal of the first controllable switching element is connected to the first signal terminal and connected to one touch electrode block of the plurality of touch electrode blocks, and the second terminal of the first controllable switching element is connected to one pressure sensing electrode block of the plurality of pressure sensing electrode blocks;

the second controllable switching element comprises a control terminal, a first terminal and a second terminal, wherein the control terminal of the second controllable switching element is inputted with a second drive signal, the first terminal of the second controllable switching element is connected to the second signal terminal, and the second terminal of the second controllable switching element is connected to one pressure sensing electrode block of the plurality of pressure sensing electrode blocks;

the first controllable switching element is configured to be controlled by the first drive signal to be turned on, the second controllable switching element is configured to be controlled by the second drive signal to be turned off, and the first signal terminal outputs the touch sensing signal, during the touch sensing period; and the first controllable switching element is configured to be controlled by the first drive signal to be turned off, the second controllable switching element is configured to be controlled by the second drive signal to be turned on, and the second signal terminal outputs the pressure sensing signal, during the pressure sensing period.

3. The array substrate according to claim 2, wherein the first controllable switching element is a first transistor, and the second controllable switching element is a second transistor.

4. The array substrate according to claim 3, wherein the first transistor has a same conductive type as the second transistor.

5. The array substrate according to claim 4, wherein each of the first transistor and the second transistor is an N-type transistor.

6. The array substrate according to claim 4, wherein each of the first transistor and the second transistor is a P-type transistor.

7. The array substrate according to claim 3, wherein the first transistor has a different conductive type from the second transistor.

8. The array substrate according to claim 7, wherein the first drive signal is same as the second drive signal, and the first drive signal and the second drive signal are outputted from a same drive signal terminal.

9. The array substrate according to claim 7, wherein the first transistor is an N-type transistor, and the second transistor is a P-type transistor.

10. The array substrate according to claim 7, wherein the first transistor is a P-type transistor, and the second transistor is an N-type transistor.

11. The array substrate according to claim 3, wherein each of the first transistor and the second transistor is a thin film transistor or a field effect transistor.

12. The array substrate according to claim 1, wherein each touch electrode block of the plurality of touch electrode blocks and each pressure sensing electrode block of the plurality of pressure sensing electrode blocks is a transparent electrode block.

13. The array substrate according to claim 1, wherein the array substrate comprises a common electrode, and wherein the plurality of touch electrode blocks and the plurality of pressure sensing electrode blocks are formed by dividing the common electrode.

14. A display panel, comprising an array substrate, wherein the array substrate comprises:
a plurality of touch electrode blocks;
a plurality of pressure sensing electrode blocks, wherein each pressure sensing electrode block of the plurality of pressure sensing electrode blocks is embedded within a corresponding touch electrode block of the plurality of touch electrode blocks, and the plurality pressure sensing electrode blocks are not in contact with the plurality of touch electrode blocks; and
a plurality of drive modules, wherein each drive module of the plurality of the drive modules is configured to:
electrically connect a touch electrode block of the plurality of touch electrode blocks to a corresponding pressure sensing electrode block of the plurality of pressure sensing electrode blocks, the corresponding pressure sensing electrode block being embedded within the touch electrode block,
input a touch sensing signal during a touch sensing period to the touch electrode block and the corresponding pressure sensing electrode block,
electrically disconnect the touch electrode block from the corresponding pressure sensing electrode block embedded within the touch electrode block, and
input a pressure sensing signal to the corresponding pressure sensing electrode block during a pressure sensing period.

15. A display device, comprising a display panel, wherein the display panel comprises an array substrate,
wherein the array substrate comprises:
a plurality of touch electrode blocks;
a plurality of pressure sensing electrode blocks, wherein each pressure sensing electrode block of the plurality of pressure sensing electrode blocks is embedded within a corresponding touch electrode block of the plurality of touch electrode blocks, and the plurality pressure sensing electrode blocks are not in contact with the plurality of touch electrode blocks; and
a plurality of drive modules, wherein each drive module of the plurality of the drive modules is configured to:
electrically connect a touch electrode block of the plurality of touch electrode blocks to a corresponding pressure sensing electrode block of the plurality of pressure sensing electrode blocks, the corresponding pressure sensing electrode block being embedded within the touch electrode block,
input a touch sensing signal during a touch sensing period to the touch electrode block and the corresponding pressure sensing electrode block,
electrically disconnect the touch electrode block from the corresponding pressure sensing electrode block embedded within the touch electrode block, and input a pressure sensing signal to the corresponding pressure sensing electrode block during a pressure sensing period.

\* \* \* \* \*

UNITED STATES PATENT AND TRADEMARK OFFICE
CERTIFICATE OF CORRECTION

PATENT NO. : 10,019,104 B2
APPLICATION NO. : 15/211983
DATED : July 10, 2018
INVENTOR(S) : Yizhi Yang It is certified that error appears in the above-identified patent and that said Letters Patent is hereby corrected as shown below:

On the Title Page

In (73) Assignees: TIANMAN MICRO-ELECTRONICS CO., LTD., Shenzhen (CN)
Please replace TIANMAN with TIANMA.

Signed and Sealed this
Twenty-first Day of August, 2018

Andrei Iancu
*Director of the United States Patent and Trademark Office*